United States Patent
Lockwood et al.

(10) Patent No.: US 7,487,397 B2
(45) Date of Patent: Feb. 3, 2009

(54) METHOD FOR CACHE CORRECTION USING FUNCTIONAL TESTS TRANSLATED TO FUSE REPAIR

(75) Inventors: Walter R. Lockwood, Round Rock, TX (US); Ryan J. Pennington, Austin, TX (US); Hugh Shen, Austin, TX (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 11/260,562

(22) Filed: Oct. 27, 2005

(65) Prior Publication Data
US 2007/0101194 A1 May 3, 2007

(51) Int. Cl.
*G06F 11/00* (2006.01)
(52) U.S. Cl. ...................................................... 714/30
(58) Field of Classification Search .................. 714/30, 714/733
See application file for complete search history.

(56) References Cited

U.S. PATENT DOCUMENTS

| | | | | |
|---|---|---|---|---|
| 5,764,655 A | * | 6/1998 | Kirihata et al. | 714/733 |
| 5,835,504 A | * | 11/1998 | Balkin et al. | 714/723 |
| 6,407,950 B2 | * | 6/2002 | Ooishi | 365/189.14 |
| 6,505,308 B1 | * | 1/2003 | Schwarz | 714/30 |
| 6,651,202 B1 | * | 11/2003 | Phan | 714/733 |
| 7,017,094 B2 | * | 3/2006 | Correale et al. | 714/733 |
| 2002/0108073 A1 | * | 8/2002 | Hughes | 714/7 |
| 2002/0120887 A1 | * | 8/2002 | Hughes et al. | 714/42 |

* cited by examiner

*Primary Examiner*—Robert Beausoliel
*Assistant Examiner*—Amine Riad
(74) *Attorney, Agent, or Firm*—Casimer K. Salys; Jack V. Musgrove

(57) ABSTRACT

A method of correcting defects in a storage array of a microprocessor, such as a cache memory, by operating the microprocessor to carry out a functional test procedure which utilizes cache memory, collecting fault data in a trace array during the functional test procedure, identifying a location of the defect in the cache memory using the fault data, and repairing the defect by setting a fuse to reroute access requests for the location to a redundant array. The fault data may include an error syndrome and a failing address. The functional test procedure creates random cache access sequences that cause varying loads of traffic in the cache memory using a test pattern based on a random seed. The functional test procedure may be carried out after completion of a nonfunctional, built-in self test of the microprocessor which sets some of the fuses.

5 Claims, 3 Drawing Sheets

METHOD FOR CACHE CORRECTION USING FUNCTIONAL TESTS TRANSLATED TO FUSE REPAIR

BACKGROUND OF THE INVENTION

1. Field of the Invention

The present invention generally relates to computer systems, and more particularly to a method of handling defects in a storage array such as a cache memory of a computer system.

2. Description of the Related Art

The basic structure of a conventional symmetric multi-processor computer system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to one or more service processors 18a, 18b, a system memory device 20, and various peripheral devices 22. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory device 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. The PCI host bridge interconnecting peripherals 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device. The service processors can alternately reside in a modified PCI slot which includes a direct memory access (DMA) path.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processing unit includes the POWER5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b includes an on-board (L1) cache (typically, separate instruction and data caches) implemented using high speed memory devices. Caches are commonly used to temporarily store values that might be repeatedly accessed by a processor, in order to speed up processing by avoiding the longer step of loading the values from system memory 20. A processing unit can include another cache such as a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 4 megabytes, and L3 cache 32 might have a storage capacity of 32 megabytes. To facilitate repair/replacement of defective processing unit components, each processing unit 12a, 12b, 12c, 12d may be constructed in the form of a replaceable circuit board, pluggable module, or similar field replaceable unit (FRU), which can be easily swapped, installed in, or swapped out of system 10 in a modular fashion.

The control logic for a cache memory, and in particular a cache directory, may include error correction code (ECC) circuits to handle errors that arise in a cache line. A bit in a given cache block may contain an incorrect value either due to a soft error (such as stray radiation or electrostatic discharge) or to a hard error (a defective cell). ECCs can be used to reconstruct the proper data stream. Some ECCs can only be used to detect and correct single-bit errors, i.e., if two or more bits in a particular block are invalid, then the ECC might not be able to determine what the proper data stream should actually be, but at least the failure can be detected. Other ECCs are more sophisticated and even allow detection or correction of multi-bit errors. These latter errors are costly to correct, but the design tradeoff is to halt the machine when double-bit (uncorrectable) errors occur.

These ECC circuits are one way to deal with soft errors arising in memory cells. Another approach used for dealing with hard errors is to provide redundancy within the arrays (directory, LRU, cache). When a cache chip is fabricated, it can be evaluated by a wafer-level test or a built-in self test (BIST) to determine if there are any defective row or column lines in each of the arrays (row and column lines are typically tested for the entire cache, directory, and LRU). If an array is defective, a fuse can be used to indicate its defective nature (a hard fuse can be permanently blown, or a soft fuse can be programmably set). A comparison is then made inside the array for each accessed address to see if it matches with a defective address. If so, appropriate logic re-routes the address to one of many extra row and column lines formed on the chip, i.e., from redundant bit lines (columns) and word lines (rows). The number of extra bit and word lines may vary depending upon the defect rate and desired chip yield. For a low-defect (larger physical size) cache, two extra lines might be provided for every 256 regular lines, while in a high-defect (smaller physical size) cache, two extra lines might be provided for every eight regular lines. In addition to the re-routing of defective lines, trace array data can be collected to isolate specific defect locations for further analysis of the manufacturing process.

With advancements in chip fabrication and computer configurations, L2 and L3 caches are significantly increasing in size, requiring larger on-chip directories and on-chip (or off-chip) data cache entry arrays. These larger, dense arrays decrease the reliability of the overall chip/system due to increased chances of defects that occur in manufacturing or after deployment in the field. While soft errors (i.e., intermittent faults) are easily corrected using ECC circuits that repair and re-write the data in the directory, this technique does not solve hard faults that occur over time, i.e., after wafer-level or BIST testing, particularly end-of-life defects. In the field, when the silicon has suffered a maximum threshold of hard array errors, then the system to which it belongs will shutdown that unit (in this case the processor), and the part must be scrapped. It would, therefore, be desirable to devise an improved method of handling errors in a storage array such as a cache memory, which could correct hard errors that arise in the field after wafer-level or BIST testing. It would be further advantageous if the method could identify repairable array failures over a range of environmental conditions.

SUMMARY OF THE INVENTION

It is therefore one object of the present invention to provide an improved method of handling errors in a cache memory.

It is another object of the present invention to provide such a method which corrects hard errors that might otherwise arise in the field after factory testing.

It is yet another object of the present invention to provide an improved method of identifying potential repairable failures in a computer storage array.

The foregoing objects are achieved in a method of handling a defect in a storage array of a microprocessor, by operating the microprocessor to carry out a functional test procedure which utilizes the storage array, collecting fault data in a trace array during the functional test procedure, identifying a location of the defect in the storage array using the fault data, and repairing the defect by setting a fuse to reroute access requests for the location to a redundant element for the storage array. The fault data may include, for example, an error syndrome and a failing address. Control logic determines that a repair for the defective location is possible by examining the availability of the fuses, which are preferably soft fuses. In the illustrative implementation, the storage array is a cache memory for a processing unit of the microprocessor, and the functional test procedure creates random cache access sequences that cause varying loads of traffic in the cache memory using a test pattern based on a random seed. The functional test procedure may be carried out after completion of a nonfunctional, built-in self test of the microprocessor which sets some of the fuses. The functional test procedure may be loaded in the microprocessor using an interface port which transmits test software from an external test unit to the control logic.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
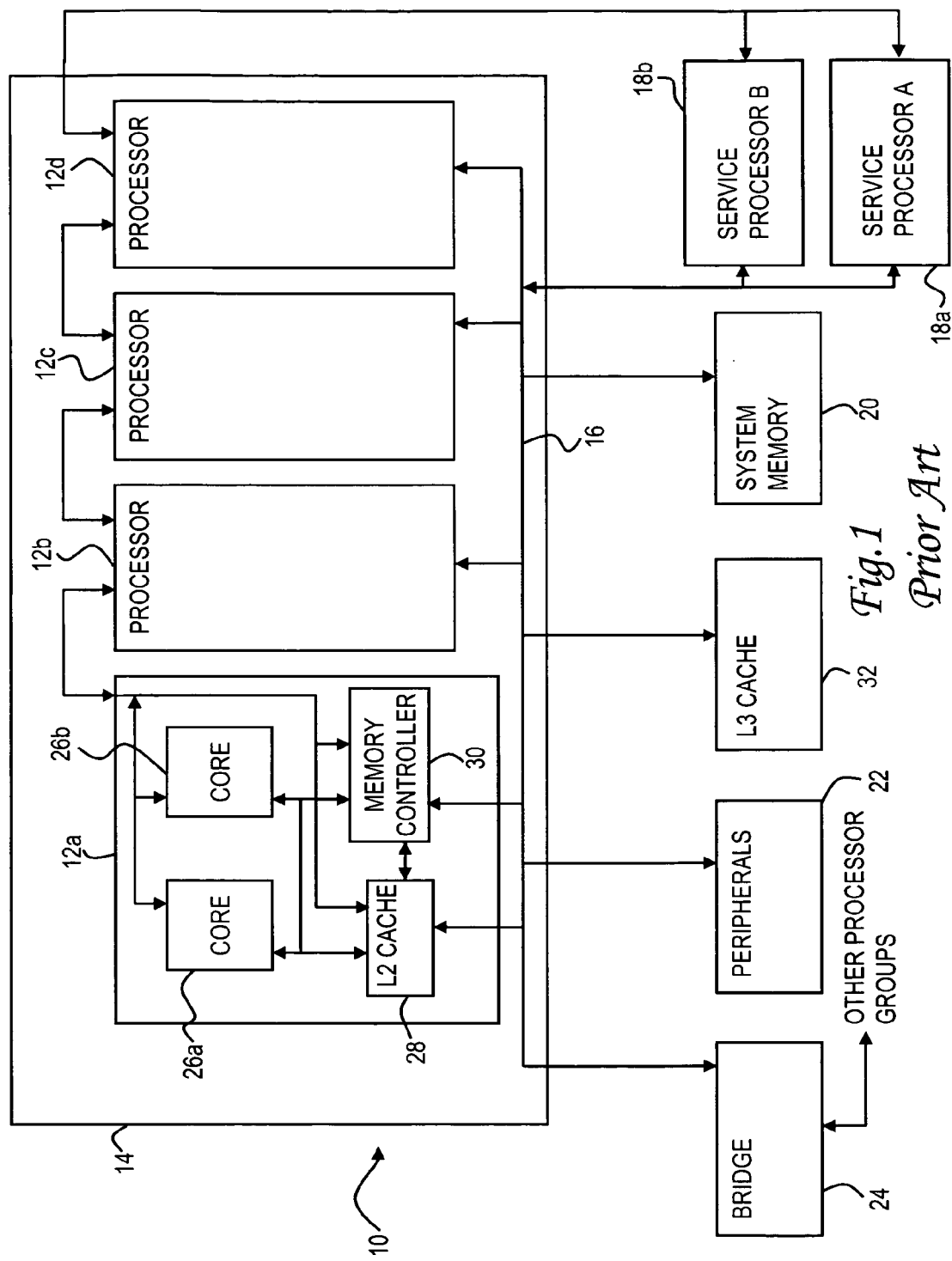
FIG. 1 is a block diagram depicting a conventional symmetric multi-processor (SMP) computer system having generally identical processing units with cache memories.
Figure 2:
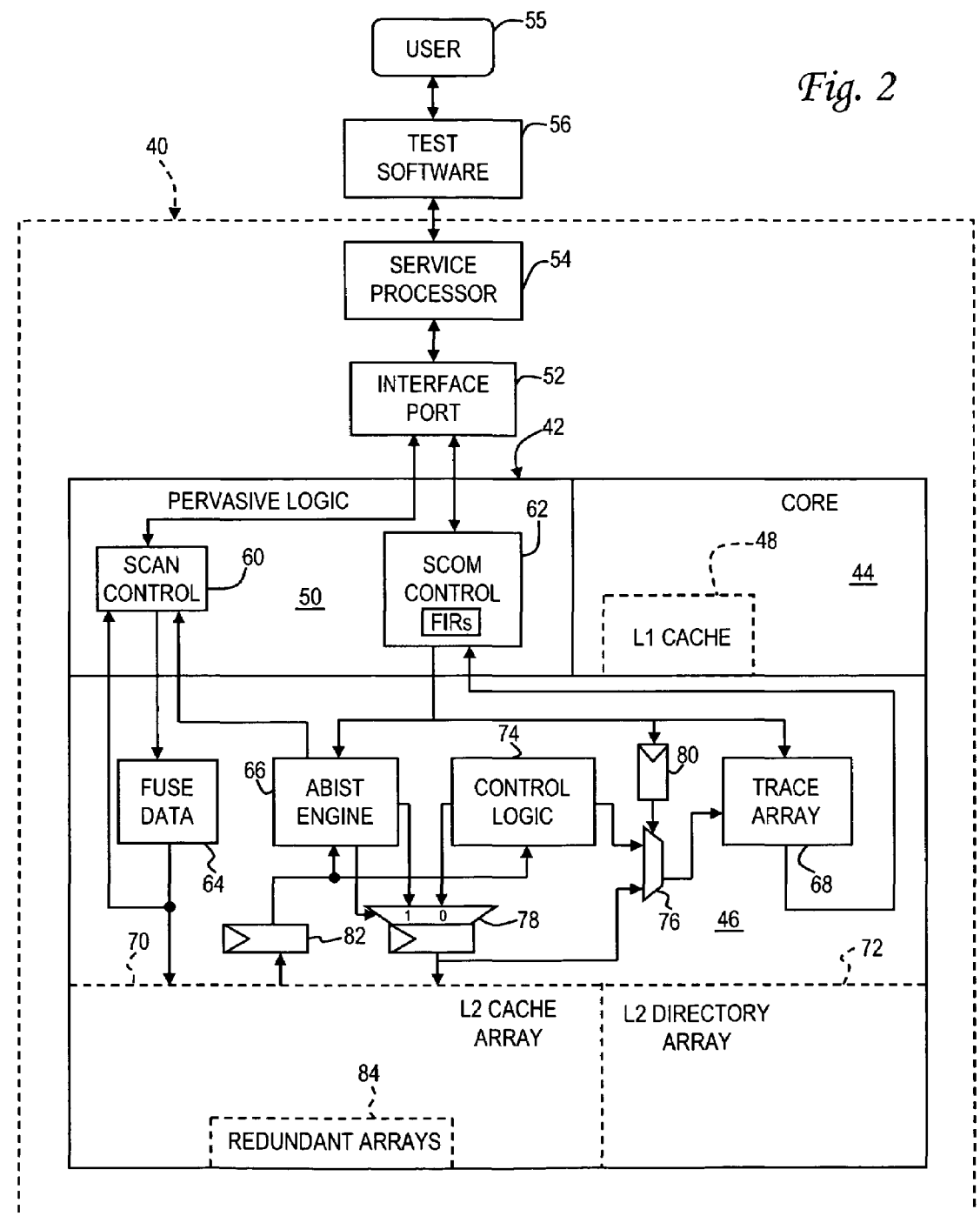
FIG. 2 is a high-level schematic diagram of a microprocessor chip having a processor core, on-board (L1) cache, and an L2 cache that includes error detection and correction logic in accordance with one embodiment of the present invention.

With reference now to the figures, and in particular with reference to FIG. 2, there is depicted one embodiment 40 of a computer system constructed in accordance with the present invention. Computer system 40 includes a processing unit 42 having one or more processor cores 44 and a second level (L2) cache 46. Each processor core has its own L1 (on-board) cache 48. Computer system 40 may include additional features not shown in FIG. 2, such as system memory, one or more interconnect buses, and peripheral devices.

Computer system 40 also includes pervasive logic 50 which is used to load values into internal latches and access internal registers of various components in system 40. Pervasive logic 50 may be connected to an interface (JTAG) port 52 which in turn is connected to a service processor 54. JTAG port 52 complies with the Institute of Electrical and Electronics Engineers (IEEE) standard 1149.1 pertaining to a test access port and boundary-scan architecture. JTAG port 52 is connected to a scan ring controller 60 and a scan communications (SCOM) controller 62. SCOM controller 62 allows the service processor to access "satellites" located in the clock-controlled (functional) components of system 40 during normal operation of the system. These SCOM satellites have internal control and error registers which can be used to enable various functions in the components. SCOM is an extension to the JTAG protocol allowed by IEEE standard 1149.1, that provides read and write access of the internal registers while leaving system clocks running. SCOM controller 62 may include appropriate logic to arbitrate between JTAG interface 52 and any assembly code commands from the processor cores. SCOM controller 62 may alternatively be connected to an external SCOM interface which provides chip-to-chip communications without requiring involvement of the service processor. Scan ring controller 60 provides the normal JTAG scan function in a level sensitive scan design (LSSD) to set the internal latch state of the system with functional clocks stopped.

Service processor 54 receives commands via an Ethernet (CAT5) connection from test software 56 loaded on an external test unit which is managed by a user 55. The user controls the test software to load a functional test program into a particular component or components of system 40, and in particular to test L2 cache 46. For example, the test software may instruct pervasive logic 50 to load a functional stress routine using test patterns. A functional test is a procedure that is carried out by system 40 while operating in its normal processing mode with system clocks controlling the operation, as opposed to procedures that are performed with free-running clocks outside control of the system clocks.

Using functional test patterns, it is possible to detect potential defects in the cache arrays that might not otherwise be noticed until the part is near the end of its useful life. Testing may advantageously be performed by introducing additional stresses to the cache arrays, and can assess them in non-standard ways such as by applying random (or pseudo-random) loads across the silicon. In particular, additional stress caused by the functional testing can cause repairable array failures that were not detected during wafer-level or BIST testing. These failures can appear as either uncorrectable or correctable data errors. By applying trace array data collected during the functional test, any failing array can be specifically identified, and the necessary actions can be taken to repair the failure via soft fuses.

Referring again to FIG. 2, L2 cache 46 includes a fuse data register 64 which stores information on array defects and controls the soft fuses that reroute requests for defective lines to redundant elements. In the illustrative embodiment, some defect information in fuse data register 64 may be set initially by wafer-level testing, or using an automatic built-in self test (ABIST) engine 66. Fuse data register 64 and ABIST engine 66 are connected to scan control 60, i.e., scan control 60 can set the repair information in fuse data 64 based on test results from ABIST engine 66. Fuses enable the array's internal decoding logic to replace specified word-lines or bit-lines with redundant word-lines or bit-lines.

After these non-functional tests are completed, test software 56 initiates the additional functional testing. A trace array 68 controlled by SCOM control 62 is set to a cache mode wherein it records errors arising in L2 cache 46. For example, a trace array 68 can store syndrome information produced by error-correction code (ECC) circuitry within L2 data array 70 or L2 directory 72 along with the failing addresses or other information required to pin down the physical location of an array access. Trace array 68 receives this information from a debug bus which includes control logic 74 and a multiplexer 76. The debug bus passes assorted functional information by setting the select lines of multiplexer 76 using a latch 80 connected to SCOM control 62. Control logic 74 receives cache and directory data outputs from an output latch 82, and feeds selected information to a first input of multiplexer 76. The second input of multiplexer 76 is connected to the output of another multiplexer 78 which provides signals that control the operations of the L2 cache array 70 and L2 directory array 72. Trace array 68 can be directly read via SCOM.

During the array built-in self test, multiplexer 78 is selected to pass array control information and data inputs from ABIST engine 66 into the L2 cache array 70 and L2 directory array 72. Array output latch 82 passes the data output from the arrays to both ABIST engine 66 and control logic 74. ABIST engine 66 processes the data output during ABIST testing to determine defects in the array.

During functional testing the select line for multiplexer 78 is always set to pass functional array controls from control logic 74, and ABIST engine 66 is shutdown. The control logic processes the data output from the arrays to check for ECC errors on the cache and directory data output from latch 82. It can then send ECC syndrome information through multiplexer 76 to the trace arrays, with select latch 80 set. Multiplexer 76 can have multiple inputs and selects, one of which can be set to pass array control and ECC syndrome information to trace array 68.

Trace array 68 stores array access data from the debug bus on every cycle while the cache mode is set. Trace array 68 has a control register that can stop trace array 68 from storing new information based on a specific signal from fault isolation registers (FIRs) within SCOM control 62. Each respective unit on the chip has a set of FIR registers, in particular the units with large arrays such as the L1 data and instruction caches, the L2 cache and directory, and the L3 directory, forming a hierarchical organization in the chip. Each bit in the FIRs can be configured to report any recoverable error. In the illustrative implementation, any uncorrectable or correctable array event can be set to cause trace array 68 to stop storing new information.

Functional test patterns are loaded into processing unit 42 from test software 56 using the scan and SCOM controls. The functional test is effectively a low-level computer program that can test the cache arrays in a random manner. The functional test acts as a low-level kernel which creates the random sequences that cause varying loads of cache traffic. A test pattern based on a random seed can be used to generate random code streams. The random streams preferably have a bias toward vector computing-type operations which have large data sets that will exercise all arrays of the chip. As an alternative to loading the functional test from test software 56, it may be permanently stored in read-only memory provided on chip 42.

While the functional test pattern is running, the environment under which system 40 is being tested can be modulated to vary the characteristics of the silicon. The environmental parameters that are adjusted may include voltage and temperature. By increasing and decreasing temperature, the speed at which the silicon operates is modified, which can expose different critical data paths on the silicon, especially in metal-dominated regions. By varying the voltage, the switching characteristics of the transistors are changed and again modify critical paths in the silicon, which may reveal potential defects on the chip.

As the test patterns are running and environmental parameters are varied, the FIRs are monitored by SCOM control 62 for correctable and uncorrectable array failures. The FIRs are preferably read out in parallel to inform the user/control logic when the machine has seen an event that will trigger a stop of the trace array. Once an error is detected, the trace array data is translated to identify the location of any failing address in the arrays. The data may indicate that multiple repairs are required if several defective units are observed.

There can be more than one trace array on a processor, each collecting data from a different unit. Each trace array can be set to stop under different conditions. Multiple units can incur array failures allowing the test software to collect array data from multiple trace arrays. The trace arrays are set to capture cache access information (via select latch 80), and from this information the user/test software can determine the exact word-line address accessed that had an error. The ECC syndrome calculated from the array output data will tell the user/test software whether the data was a correctable (single-bit) or uncorrectable (double-bit) error. For a correctable error, a single bit-line can also be determined. For an uncorrectable error, only a word-line is known from the word-line address accessed. With the word-line and bit-line information, an appropriate fuse repair action can be determined.

After the defective array location is mapped, test software 56 determines whether it is possible to repair the defect using redundant arrays, by checking for available soft fuses. If repair is available, instructions are added to scan control 60 by test software 56 to update the fuse data register 64 and reroute the affected line to redundant arrays 84. Using the updated fuse repair information, the test pattern(s) can be rerun in order to verify that the repair was successful in avoiding the error and to detect for other possible array failures that may be stacked up behind the initial failure.

Figure 3:
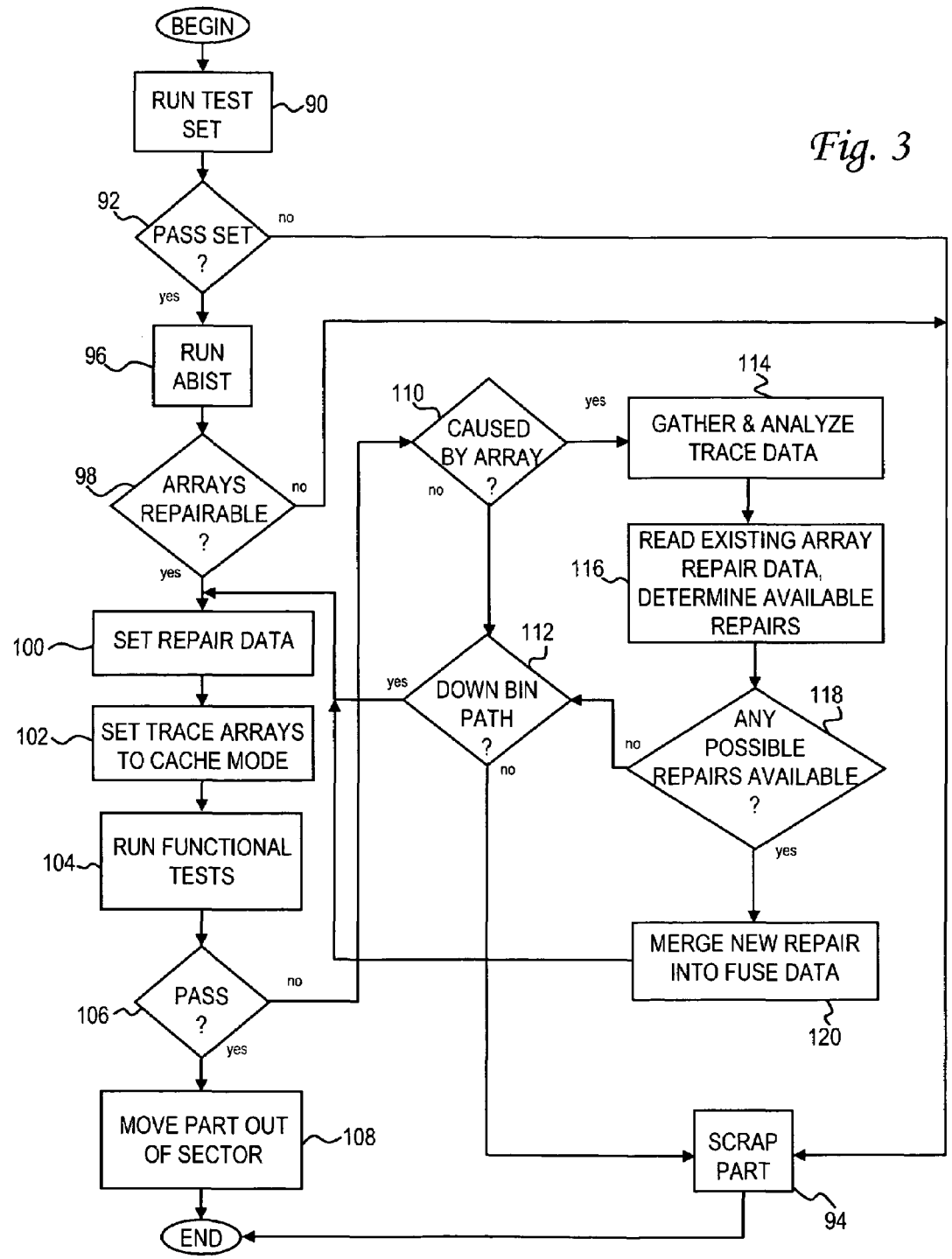
FIG. 3 is a chart illustrating the logical flow for identifying and repairing errors in a cache memory according to one implementation of the present invention.

The invention may be further understood with reference to the chart of FIG. 3 which illustrates the logical flow for an exemplary implementation of the testing process. The process begins by running a set of wafer-level tests (90). If the chip does not pass the test set (92), the part is scrapped (94). If the chip does pass wafer testing, the ABIST engine is activated to run the nonfunctional self test (96). If errors occur that are not correctable by use of redundant arrays (98), then the part is again scrapped (94). If defective arrays are repairable, the appropriate repair data is set in the fuse data register (100). Functional testing is then initiated by setting the trace array to cache mode (102), and the functional test patterns are loaded and run (104). If the functional tests pass without any errors (106), then the testing process is complete and the part is moved on to the next sector in the assembly process (108). If functional testing results in an error, a determination is made as to whether the error was caused by the cache array (110). If not, a further determination must be made as to whether the error is correctable at a lower frequency, that is, further down the bin path (112). Sometimes a part will fail at high frequencies but pass at lower frequencies (possibly due to slower transistors being manufactured). However, it may be that a part will fail even at the lowest acceptable frequency (due to a manufacturing defect or a transistor that is so slow as to make the part useless), in which case the part is again scrapped (94); otherwise, the testing process resumes carrying out the functional tests (104) but at lower frequencies. Returning to decision 110, if the error was caused by the cache array, then the trace data is gathered and analyzed to determine the location of the defect (114), and the existing array repair data in the fuse data register is read to determine if further repairs are available (116). If possible repairs (i.e., soft fuses) are not available (118), the process shifts to decision 112 and continues as previously explained. If possible repairs are available, the new repair data is merged into the fuse data register (120), and the process continues with more functional testing to check for additional errors.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention is particularly adapted for use in a cache memory, it is also useful for other storage arrays such as system memory, table lookaside buffers, etc. It is therefore contemplated that such modifications can be made without departing from the spirit or scope of the present invention as defined in the appended claims.

What is claimed is:

1. A method of handling defects in a storage array of a microprocessor, comprising:

carrying out a nonfunctional, built-in self test (BIST) of the microprocessor using a BIST engine which provides first tests results to a scan ring controller of the microprocessor, wherein the first test results include first information regarding first locations of a first set of defects in the storage array;

storing the first information in a fuse data register using the scan ring controller;

setting a first plurality of fuses using the fuse data register based on the first information, wherein the first plurality of fuses reroute access requests for the first locations to first redundant elements of the storage array;

after completion of the nonfunctional, built-in self test and said setting of the first plurality of fuses, operating the microprocessor in a normal processing mode to carry out a functional test procedure which utilizes the storage array;

collecting fault data in a trace array during the functional test procedure using control logic while the BIST engine is deactivated;

identifying second locations of a second set of defects in the storage array using the fault data;

storing second information regarding the second locations in the fuse data register using the scan ring controller; and setting a second plurality of fuses using the fuse data register based on the second information, wherein the second plurality of fuses reroute access requests for the second locations to second redundant elements of the storage array.

2. The method of claim 1, further comprising:

determining that a repair for the defective locations is possible by examining availability of the fuses.

3. The method of claim 1 wherein the first plurality of fuses and the second plurality of fuses are soft fuses.

4. The method of claim 1 wherein the fault data includes an error syndrome and a failing address.

5. The method of claim 1 wherein the storage array is a cache memory for a processing unit of the microprocessor, and the functional test procedure creates random cache access sequences that cause varying loads of traffic in the cache memory.

* * * * *